(12) United States Patent
Hotes et al.

(10) Patent No.: US 9,097,034 B2
(45) Date of Patent: Aug. 4, 2015

(54) COLLAPSIBLE FRAME FOR A SHELTER

(71) Applicant: California Industrial Facilities Resources, Inc., Kirkland, WA (US)

(72) Inventors: Douglas T. Hotes, Kirkland, WA (US); John M. Hotes, Woodinville, WA (US)

(73) Assignee: California Industrial Facilities Resources, Inc., Kirkland, WA (US)

( * ) Notice: Subject to any disclaimer, the term of this patent is extended or adjusted under 35 U.S.C. 154(b) by 130 days.

(21) Appl. No.: 13/790,842

(22) Filed: Mar. 8, 2013

(65) Prior Publication Data

US 2013/0312799 A1    Nov. 28, 2013

Related U.S. Application Data

(60) Provisional application No. 61/651,365, filed on May 24, 2012.

(51) Int. Cl.
*E04H 15/48* (2006.01)
*E04H 9/14* (2006.01)

(52) U.S. Cl.
CPC ... *E04H 15/48* (2013.01); *E04H 9/14* (2013.01); *Y10T 29/49716* (2015.01)

(58) Field of Classification Search
CPC ......... E04H 15/48; E04H 15/34; E04H 15/44; E04H 15/36; E04C 3/005; E04C 3/02; E04B 1/344; E04B 1/34357
USPC ........... 135/121–124, 120.1, 120.3, 132, 138, 135/144, 147, 151–154; 403/85, 93, 97–98, 403/101, 170; 52/645–646, 656.9, 83
See application file for complete search history.

(56) References Cited

U.S. PATENT DOCUMENTS

| 4,066,089 A * | 1/1978 | Rainwater ..................... 135/151 |
| 4,150,682 A | 4/1979 | Ryce |
| 4,666,328 A * | 5/1987 | Ryu ................................ 403/92 |

(Continued)

FOREIGN PATENT DOCUMENTS

| CN | 201666033 U | 12/2010 |
| GB | 2467385 A | 8/2010 |
| GB | 2475512 A | 5/2011 |

OTHER PUBLICATIONS

Search Report Under Section 17(5) mailed Nov. 1, 2013, issued in corresponding British Application No. 1309437.0, filed May 24, 2013, 4 pages.

(Continued)

*Primary Examiner* — Winnie Yip
(74) *Attorney, Agent, or Firm* — Kenyon & Kenyon LLP

(57) ABSTRACT

A frame is articulable between erected and a collapsed states and includes first and second frame supports. Each frame support has a pair of center frame members rotatably coupled about a center joint, each of which is selectively moveable between a first position when the frame is in the erected state and a second position when the frame is in the collapsed state. A purlin assembly has first and second purlin members that are rotatably coupled about a purlin mid-joint. A first end of the purlin assembly is pivotally coupled to the first frame support, and a second end of the purlin assembly is pivotally coupled to the second frame support. The purlin assembly is selectively lockable in an extended position when the frame is in the erected state and is rotatable to a folded position when the frame is in the collapsed state.

14 Claims, 16 Drawing Sheets

(56) References Cited

U.S. PATENT DOCUMENTS

| | | | |
|---|---|---|---|
| 4,667,692 A * | 5/1987 | Tury et al. | 135/156 |
| 5,263,507 A * | 11/1993 | Chuang | 135/140 |
| 5,584,311 A * | 12/1996 | Schaefer | 135/128 |
| 5,771,651 A * | 6/1998 | Shiina | 52/641 |
| 6,662,816 B1 * | 12/2003 | Cunningham | 135/94 |
| 7,178,537 B2 * | 2/2007 | Holub | 135/119 |
| 7,584,763 B2 * | 9/2009 | Yoon | 135/131 |
| 8,113,224 B2 * | 2/2012 | Yul et al. | 135/93 |
| 8,550,559 B2 * | 10/2013 | Sollars | 297/376 |
| 8,701,688 B2 * | 4/2014 | Vaughn et al. | 135/94 |
| 8,820,340 B2 * | 9/2014 | Hughes | 135/131 |
| 2005/0005960 A1 | 1/2005 | Prevost | |
| 2010/0243013 A1 | 9/2010 | Li | |
| 2011/0284044 A1 | 11/2011 | Baldussi | |
| 2012/0017961 A1 | 1/2012 | Hughes | |

OTHER PUBLICATIONS

International Search Report and Written Opinion mailed Oct. 4, 2013, issued in corresponding International Application No. PCT/US2013/042764, filed May 24, 2013, 10 pages.

\* cited by examiner

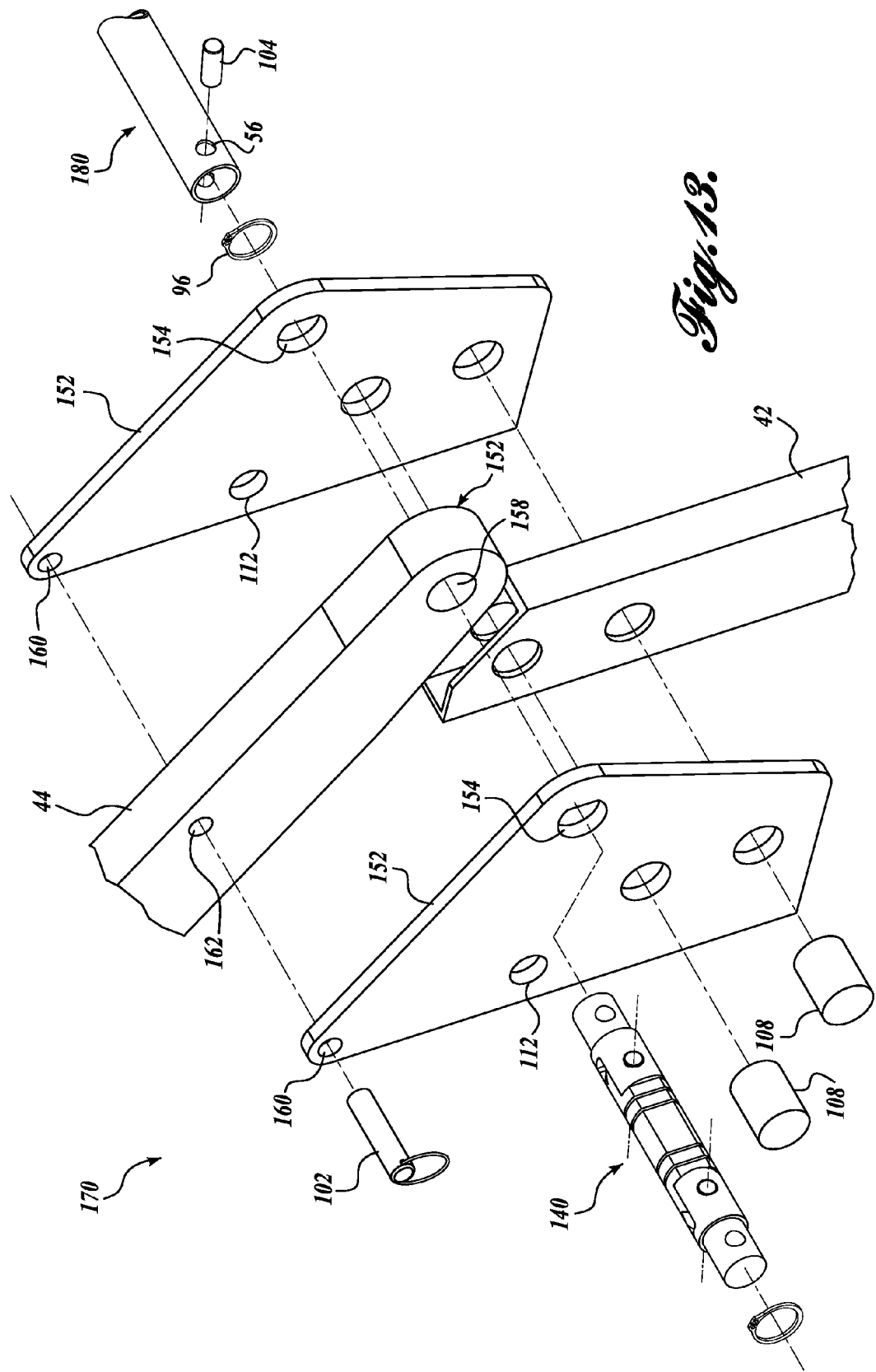

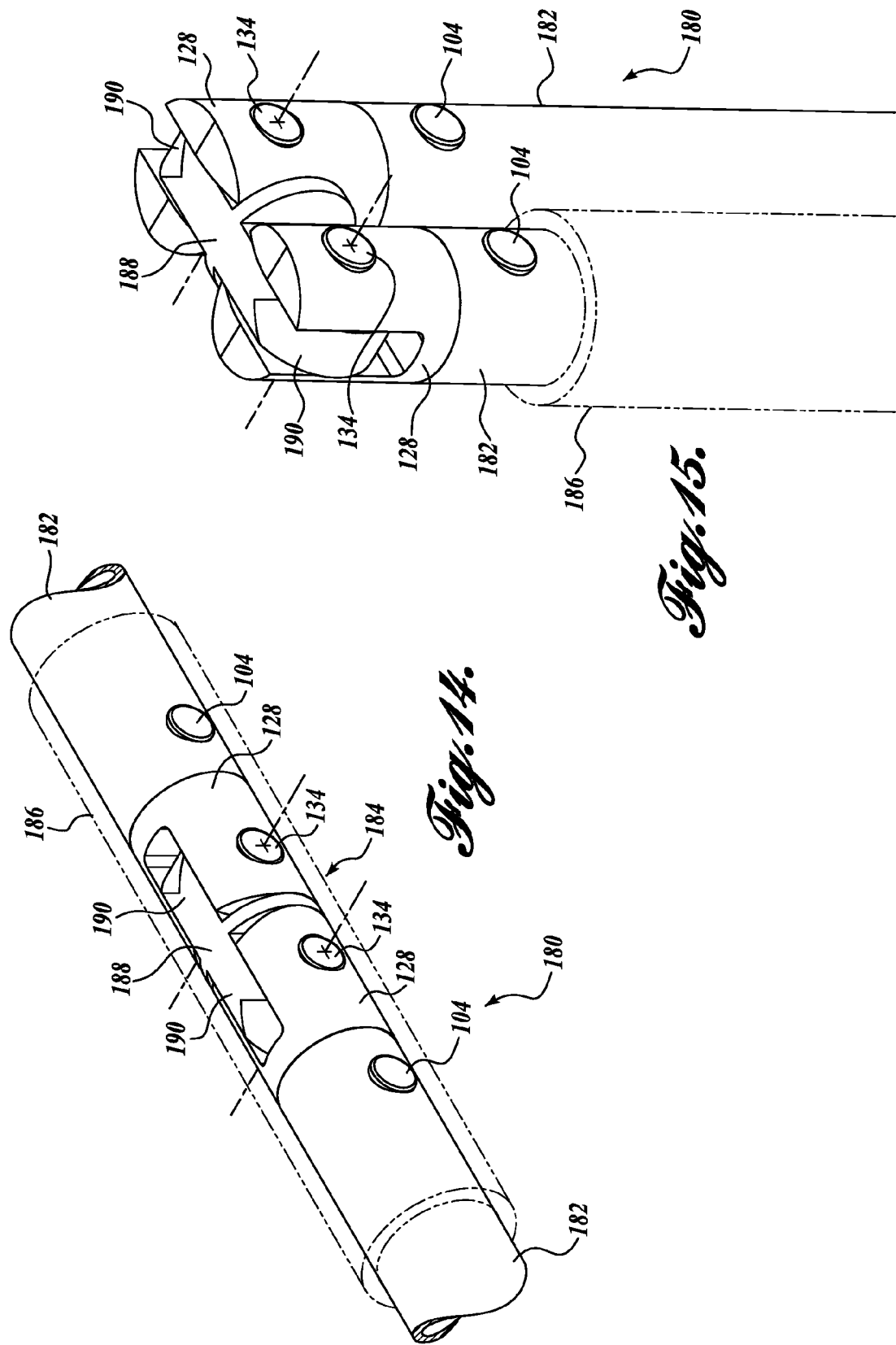

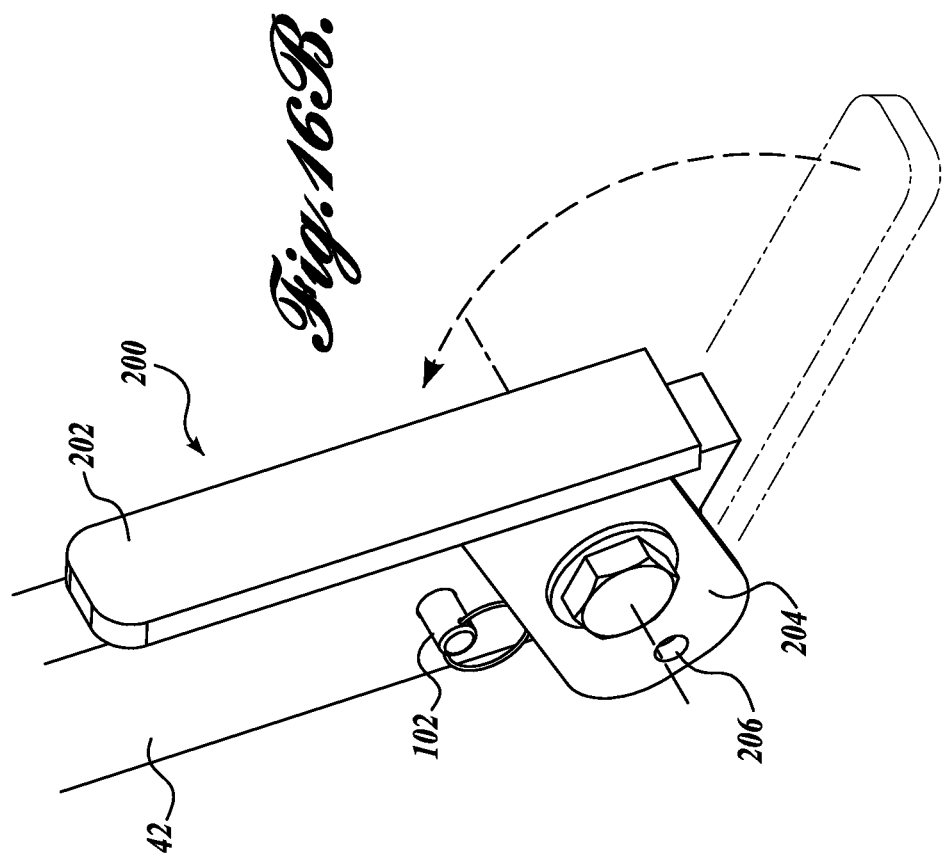
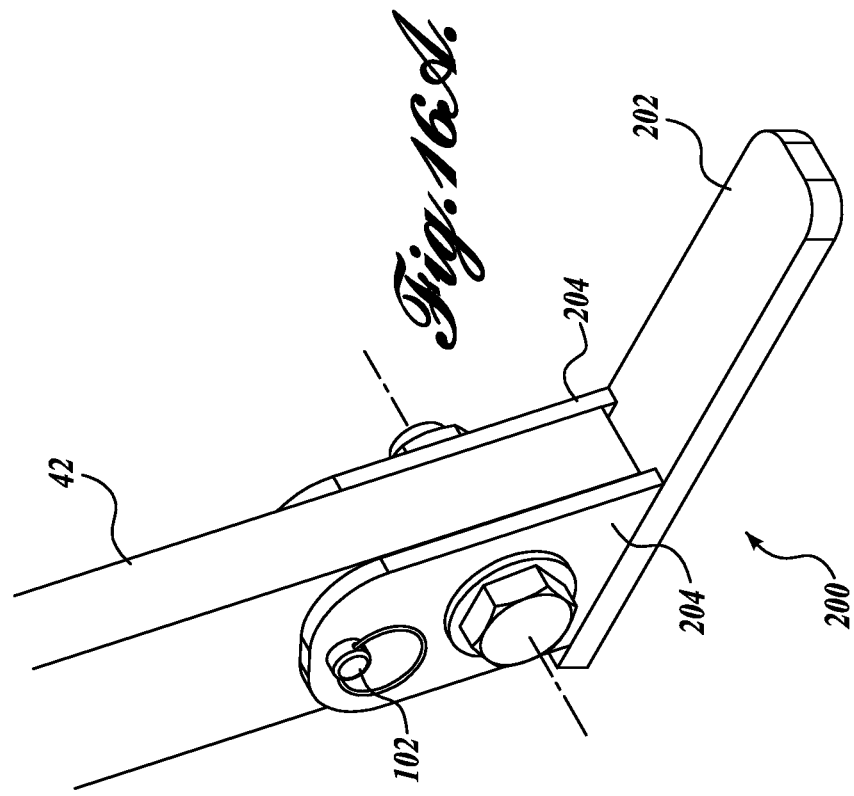

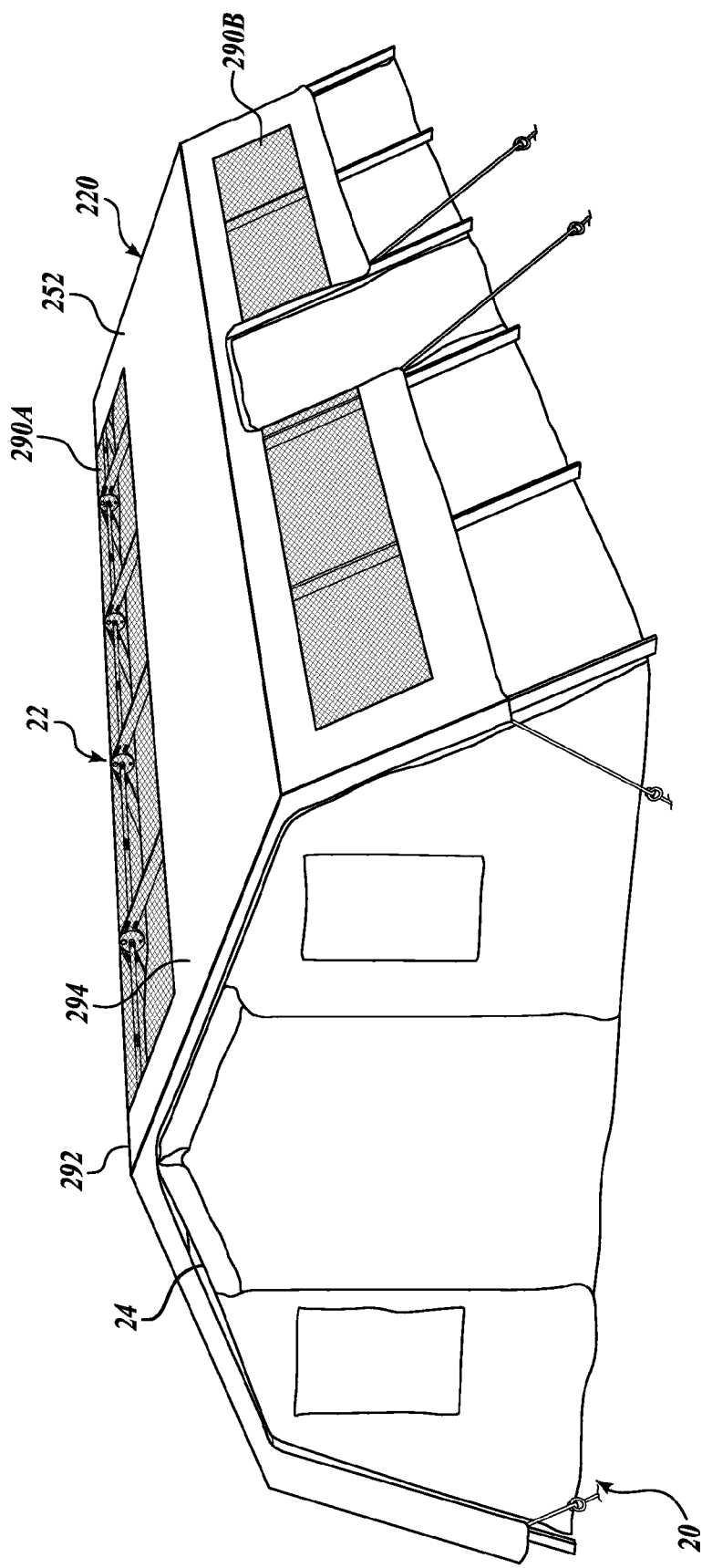

COLLAPSIBLE FRAME FOR A SHELTER

CROSS-REFERENCE TO RELATED APPLICATION

This application claims the benefit of U.S. Provisional Patent Application No. 61/651,365, filed May 24, 2012, the disclosure of which is expressly incorporated by reference.

BACKGROUND

Portable shelters are commonly used by the U.S. military and others, and are occupiable for temporarily housing military or other personnel, equipment, and/or supplies, or for providing services such as cooking, dining or medical care. Portable shelters are also used by organizations that provide humanitarian aid throughout the world. Such organizations commonly need to erect portable shelters in areas that have suffered from natural disasters, such as floods, tsunamis, hurricanes and the like. Ideally, these shelters should be designed for storage in a compact configuration that can be easily transported to a new destination for assembly and built for rugged use. Moreover, these shelters should be lightweight to make transportation easier and to make set up and disassembly manageable by a minimum number of people. Preferably, the assembly and disassembly process should be relatively quick and easy and require few hand tools.

SUMMARY

A frame for a portable shelter is disclosed. The frame can be articulated between an erected state and a collapsed state. In a first disclosed embodiment, the frame includes first and second frame supports. Each frame support has a pair of center frame members rotatably coupled about a center joint. Each pair of center frame members is selectively moveable between a first position when the frame is in the erected state and a second position when the frame is in the collapsed state. The first and second frame supports are selectively lockable in the first position. The frame further includes a purlin assembly having first and second purlin members. The first and second purlin members are rotatably coupled about a purlin mid-joint. A first end of the purlin assembly is pivotally coupled to the first frame support, and a second end of the purlin assembly is pivotally coupled to the second frame support. The purlin assembly is selectively lockable in an extended position when the frame is in the erected state and is rotatable to a folded position when the frame is in the collapsed state.

A second claimed embodiment of the disclosed subject matter is directed to a portable shelter having a plurality of selectively collapsible frame supports spaced apart in series along a longitudinal axis, wherein each frame extends transversely with respect to the longitudinal axis. The shelter further includes a plurality of purlin assemblies extending longitudinally between the frame supports, each purlin assembly connecting one frame support to an adjacent frame support and selectively maintaining a space between adjacent frame supports. Each of the plurality of purlin assemblies is foldable to move adjacent frame supports towards each other. A flexible structure is supported by the frame support members.

A third claimed embodiment of the disclosed subject matter is directed to a method of collapsing a frame for a portable shelter, the frame comprising a plurality of spaced-apart frame supports, each frame support including two center members rotatably coupled about a center joint, The frame also includes a pair of lateral members, each lateral member rotatably attached to a corresponding center member about a lateral joint, and at least one purlin assembly extending between each of the plurality of frame supports and an adjacent frame support. The method comprises the steps of (1) rotating each lateral member about the corresponding lateral joint from a first lateral member position, in which the later member extends in a downward direction from the lateral joint, to a second lateral member position, in which the lateral member is aligned with the corresponding center member; (2) moving the spaced apart frame supports together so that each frame support is proximate to one or more adjacent frame supports, movement of the frame supports folding each of the at least on purlin assemblies about a purlin mid-joint; and (3) rotating the two center members of each frame support from a first position to a collapsed position in which the two center members are aligned.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 13 is an exploded partial isometric view of the lateral frame joint of FIG. 11, the lateral frame joint being joint being a double purlin joint;

FIG. 14 is a partial isometric view of a purlin mid joint formed in accordance with aspects of the present disclosure;

FIG. 15 is an exploded partial isometric view of the purlin mid joint of FIG. 14;

FIGS. 16A and 16B show isometric views of a rotatable foot in the extended and retracted positions, respectively, formed in accordance with aspects of the present disclosure; and FIG. 17 is an example of the temporary shelter of FIG. 1 equipped with one embodiment of a solar fly in accordance with aspects of the present disclosure.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides one or more examples of a frame for use with temporary shelters and the like. As will be described in more detail below, embodiments of the frame are collapsible and aid in the quick and easy assembly of a temporary shelter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
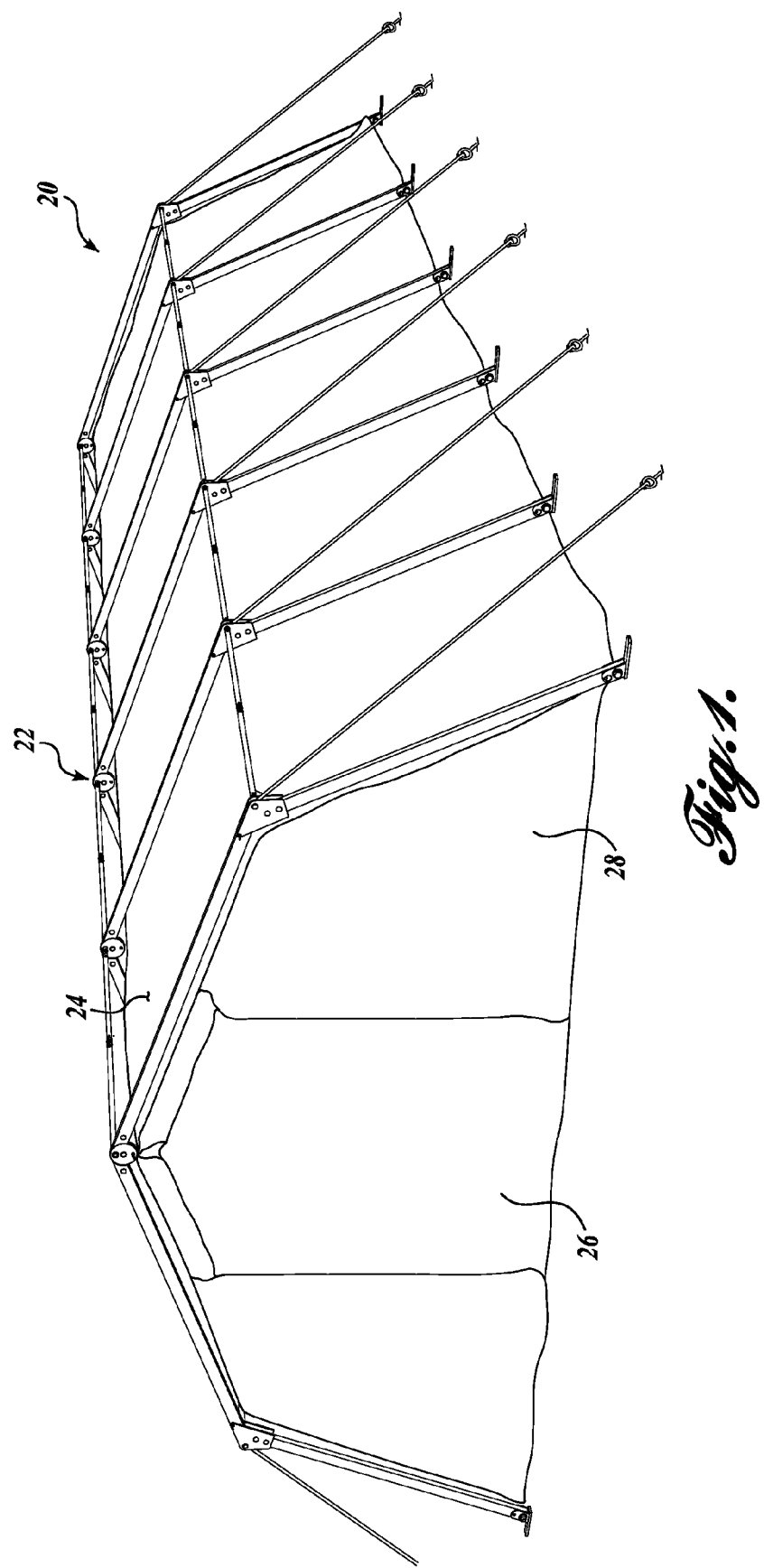
FIG. 1 is an isometric view of one representative embodiment of a temporary shelter having a collapsible frame formed in accordance with aspects of the present disclosure.
Figure 5:
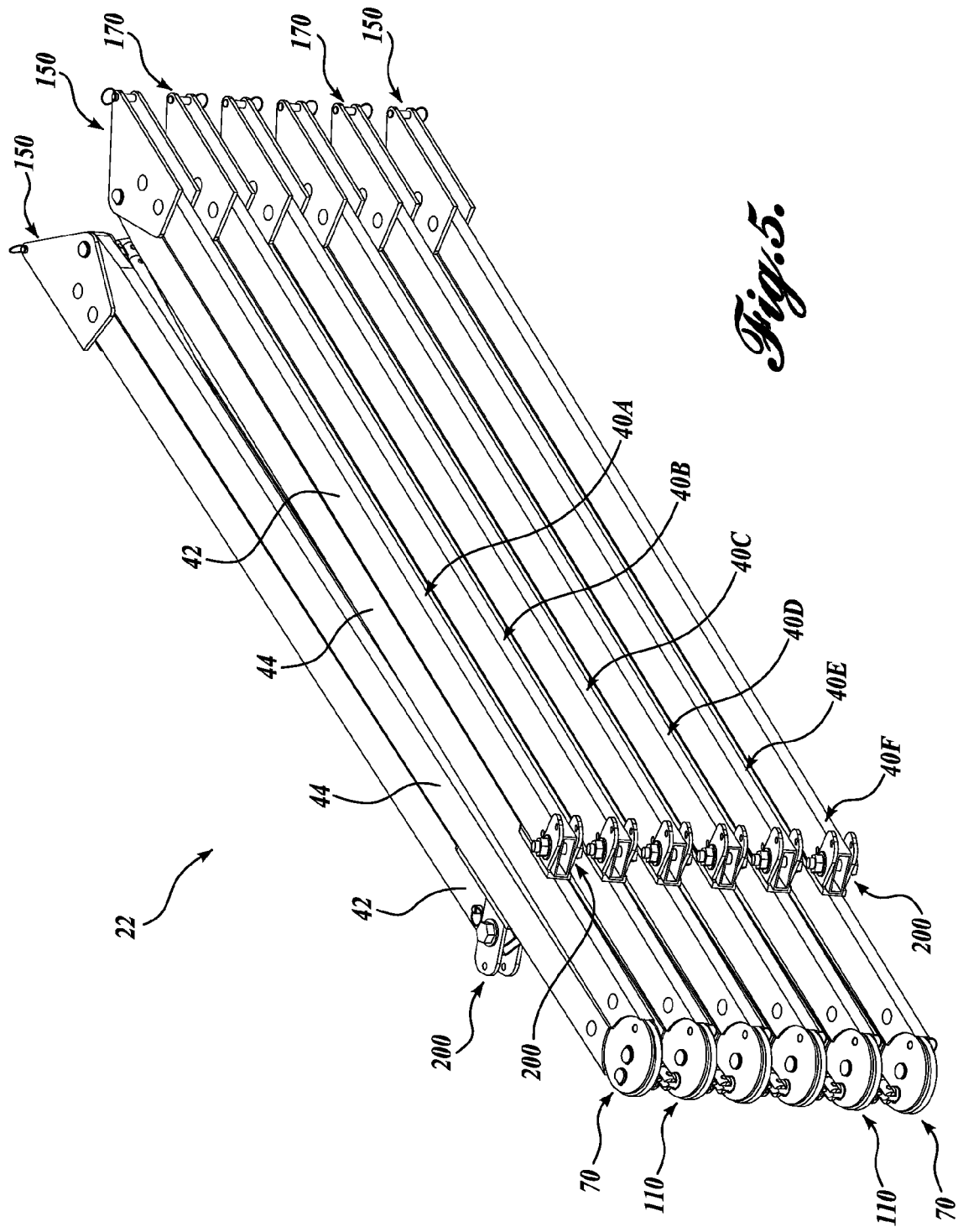
FIG. 5 is an isometric view of a collapsible frame of FIG. 2, the frame being in a collapsed state.

Referring now to FIG. 1, there is shown an example of a temporary shelter 20 formed in accordance with aspects of the present disclosure. In the embodiment shown, the shelter 20 is of the compact and portable type, and comprises a lightweight, easy-to-erect frame 22 and a durable, flexible, tent-like structure 24 suspended therefrom. The shelter 20 in some embodiments may include a door 26 in the end wall 28. As will be described in more detail below, the frame 22 is collapsible from an erect state, as shown in FIG. 2, to a collapsed state, as best shown in FIG. 5.

Figure 2:
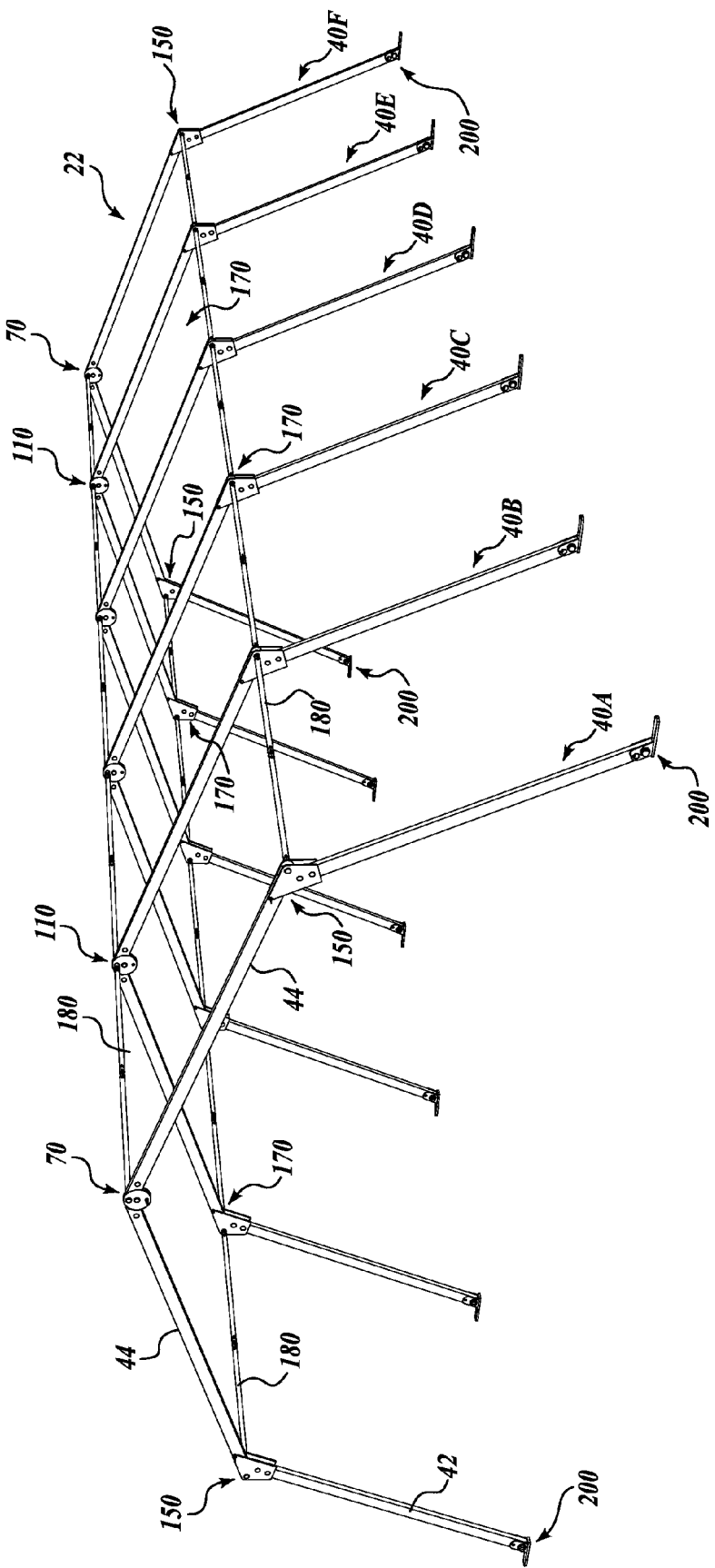
FIG. 2 is an isometric view of a collapsible frame of FIG. 1, the frame being in an erected state.

As shown in FIG. 2, the frame 22 includes a plurality of lightweight, interconnected frame supports 40A-40F (shown as six) that extend transversely with respect to the longitudinal axis of the shelter 20. When the frame 22 is erected, the frame supports 40A-40F are vertically aligned, equally spaced apart, and interconnected with adjacent frame supports by a plurality of horizontally aligned purlin assemblies 180.

Each frame support 40 comprises two elongate lateral members 42 and two elongate center members 44, although different configurations wherein the frame support includes a different number of members are possible. As illustrated, each member 42 and 44 is formed from rectangular metallic tubing, such as rectangular aluminum tubing, so as to provide a lightweight support with sufficient strength to support the shelter 20. The shape of the members 42 and 44 is not limited to the disclosed rectangular cross-section, but can be round, square, solid, or any other suitable shape. Moreover, while a lightweight metallic material, such as aluminum, is preferred, the members 42 and 44 can be formed of steel, composites, polymeric materials, or any other material having suitable strength. These and other variations as to the form of the members 42 and 44 will be appreciated by those of skill in the art and should be considered within the scope of the present disclosure.

In one embodiment, the frame members 42 and 44 and components of the purlin assemblies 180 are constructed out of 6061-T6 or 7075-T6 alloy aluminum tube and/or bar stock. Frame members and components made from 7075-T6 alloy, in particular, have similar strength to those made of steel, but with ⅓ the weight.

The center members 44 are hingedly connected end-to-end via a center frame joint 70 or 110 to form an upper frame portion. In the illustrated embodiment, center members 44 form an angle of approximately 140 degrees. The resulting A-frame type structure provides stability to the upper frame portion and to the frame 22 in general. It should be appreciated that the illustrated angle is exemplary only and should not be considered limiting. In this regard, center members 44 can be configured to be aligned, i.e., to form an angle of up to approximately 180 degrees, when the frame is erected. Alternatively, the angle formed by center members 44 can be less than approximately 140 degrees, e.g., 90 degrees or less. Moreover, embodiments are possible in which variation exists among the angles formed by the upper frame portions of different frames 22 that form the frame support 40. These and other embodiments in which the center members 44 form different angels are contemplated and should be considered within the scope of the present disclosure.

Still referring to FIG. 2, the opposite end of each of the center members 44 is coupled to an end of a lateral member 42 via a lateral frame joint 150 or 170. Each lateral member 42 extends to the ground in a downward and laterally outward direction from its respective lateral frame joint 150 or 170. In the preferred embodiment, each lateral member 42 includes an optional collapsible foot 200 disposed on an end of opposite the connection to the lateral frame joint 150 or 170. Collectively, the lateral members 42 cooperate to form a lower frame portion that supports the upper frame portion. It will be appreciated that the orientation of the lateral members 42 in the disclosed embodiment are exemplary only and that the angle of each lateral member 42 relative to its associated central members 42 can vary. In this regard, the lateral members 42 can be more vertical or less vertical when the frame 22 is erected. In other contemplated embodiments, the angles formed by associated central members 42 and lateral members 42 can differ for a particular frame support 40 or between different frame supports 40.

A plurality of purlin assemblies 180 couple each frame support 40 to the adjacent frame support or frame supports. For the end frame supports 40A and 40F, i.e., the frame supports at the longitudinal ends of the frame 22, each purlin assembly 180 extends longitudinally toward the adjacent frame support. For the interior frame supports 40B-40E, i.e., the frame supports with an adjacent frame support on each side, a plurality of purlin assemblies 180 extend longitudinally in each direction to couple the frame support to both adjacent frame supports. When the frame 22 is erected, the purlin assemblies 180 ensure proper spacing between the frame supports 40 and also provide longitudinal stability to the frame 22.

As will be described in further detail, each end of a given purlin assembly 180 is coupled to its respective frame support 40 to allow the purlin assembly to rotate relative to the frame support about a longitudinal axis, and to pivot about an axis normal to the longitudinal axis. Although the illustrated embodiment is shown to have purlin assemblies 180 located at the center frame joint 70 and 110 and each of the lateral frame joints 150 and 170, it will be appreciated that this embodiment is just one example, and that the number of purlin assemblies and the attachment position of each purlin assembly to the frame supports can vary.

Figure 6:
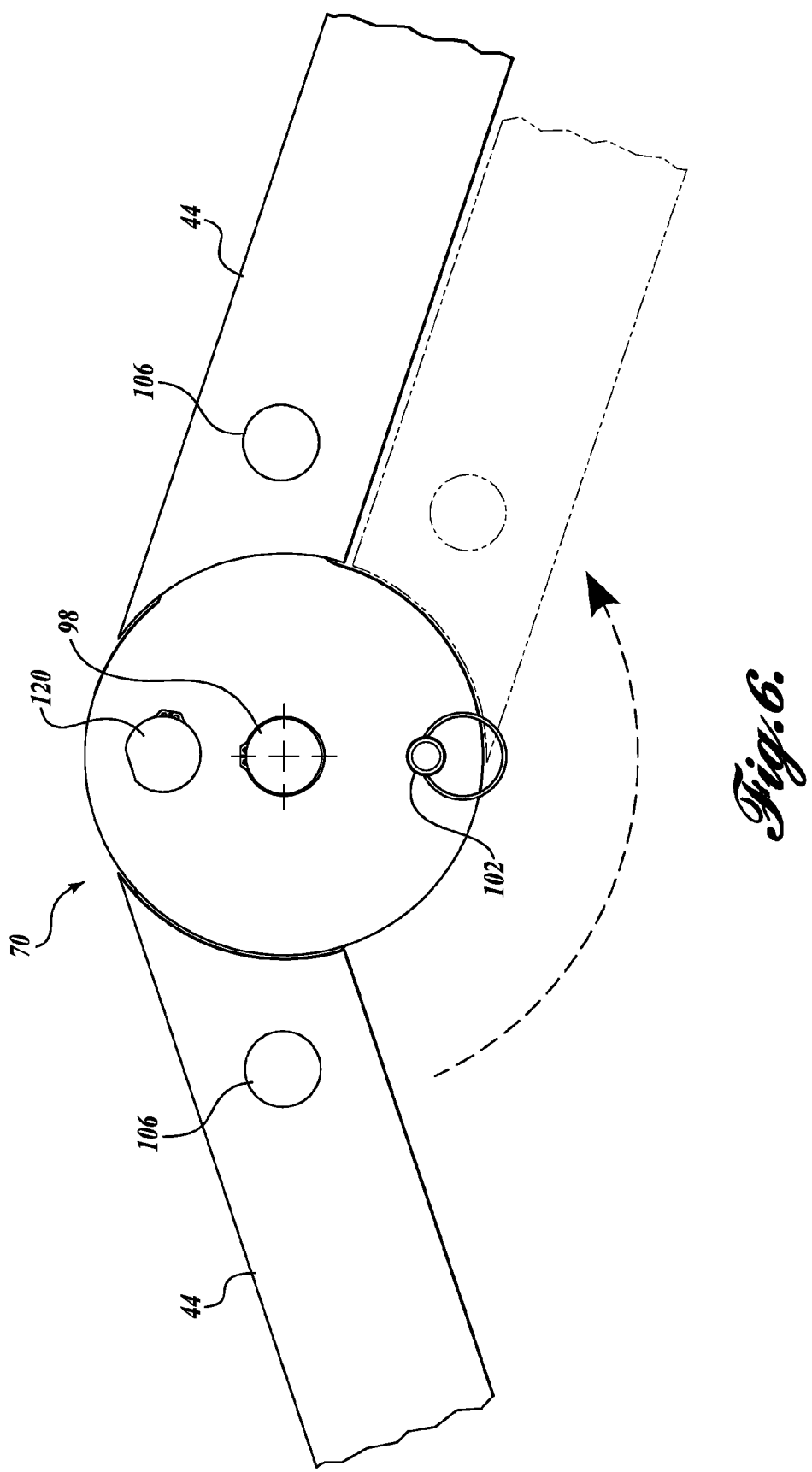
FIG. 6 is an end view of one embodiment of a center frame joint formed in accordance with aspects of the present disclosure.
Figure 7:
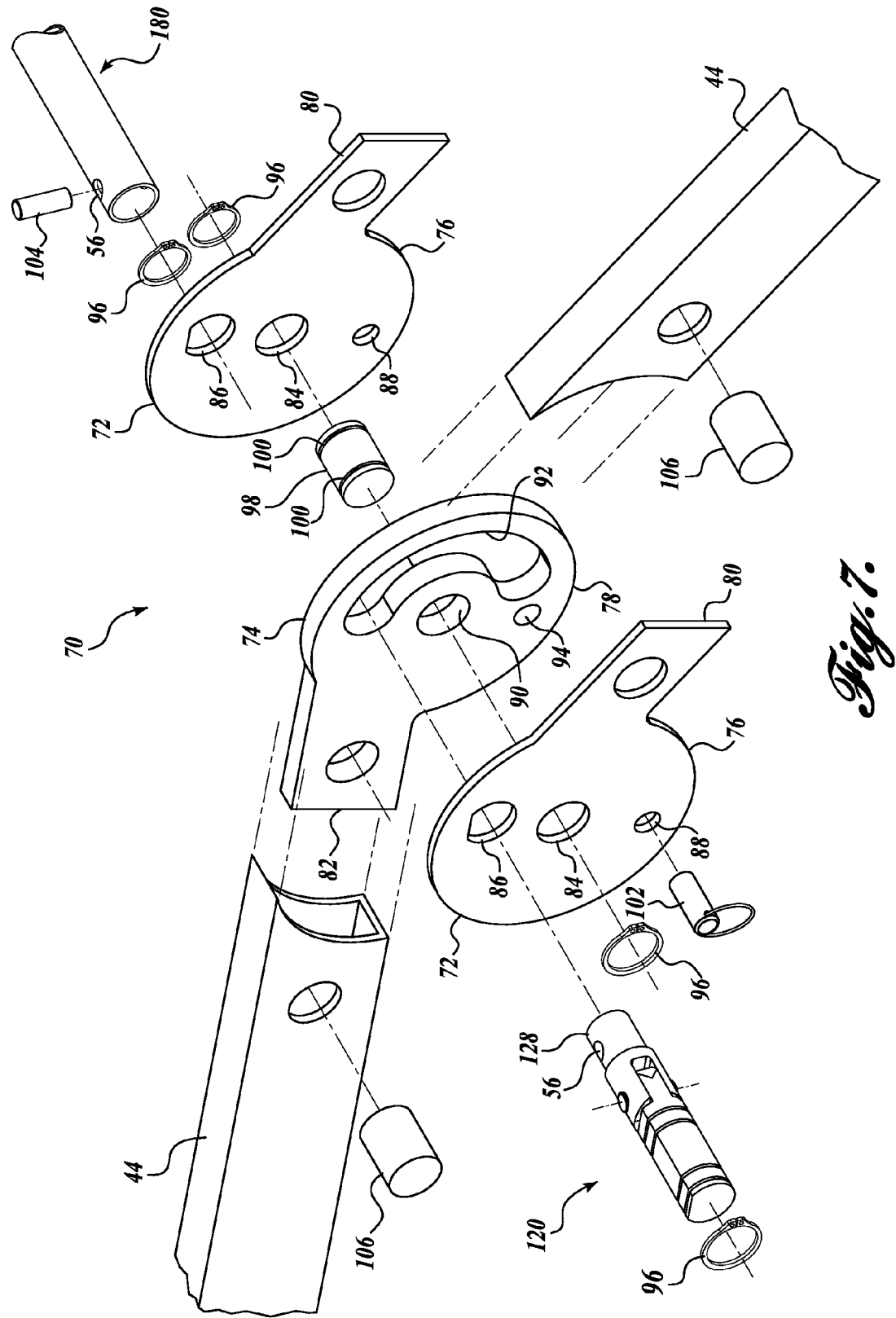
FIG. 7 is an exploded partial isometric view of the center frame joint of FIG. 6, the end frame joint being a single purlin joint.
Figure 8:
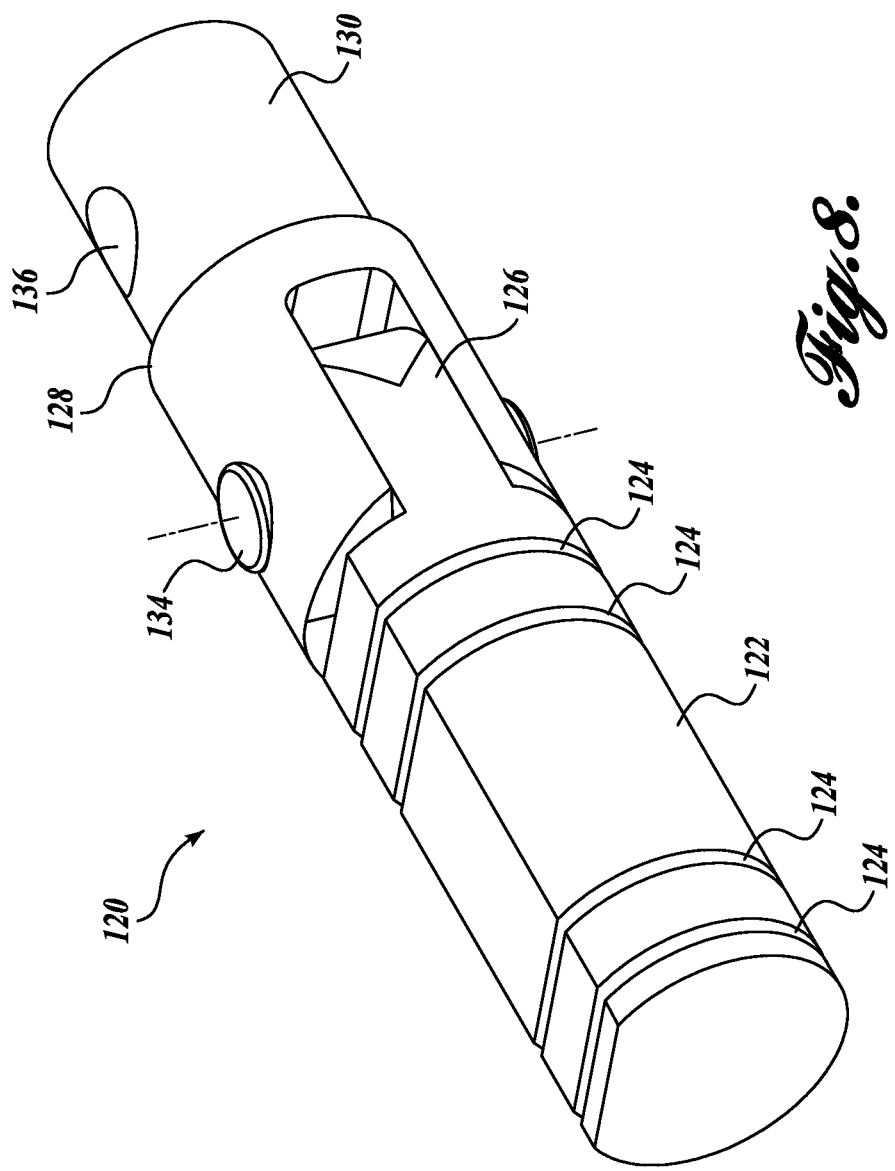
FIG. 8 is an isometric view of a pivot pin assembly of the center frame joint of FIG. 7.

Referring now to FIGS. 6-8, one example of a center frame joint 70 formed in accordance with aspects of the present disclosure will now be described. As shown in FIG. 6, the center frame joint 70 maintains the orientation of the center members 44 relative to each other when the frame 22 is erected. As will be explained in further detail below, to facilitate the collapse of the frame 22, the center frame joint 70 provides for selective rotation of the center members 44 relative to each other until the center members are generally parallel to each other, as shown in phantom lines in FIG. 6.

FIG. 7 shows a partially exploded isometric view of the center frame joint 70 shown in FIG. 6. The center frame joint 70 comprises two outer joint plates 72 and one or more inner joint plates 74. The outer and inner joint plates 72, 74 have substantially identical outer perimeters, forming almost completed cylinders 76 and 78, respectively, with rectangular-like legs 80 and 82, respectively, extending at angles therefrom. In the illustrated embodiment, the rectangular-like legs are sized and configured to be received within a center portion of the center members 44.

Each outer joint plate 72 includes a central bore 84 and two outer bores in the form of a purlin pin bore 86 and a lock pin bore 88 aligned on either side of the central bore 84. The inner joint plate 74 includes: (1) a central bore 90 sized and configured for corresponding with the central bores 84 of the outer joint plates 72; (2) an arcuate slot 92 having a diameter corresponding to the purlin pin bore 86 of the outer joint plate 72; and (3) a lock pin bore 94 sized and configured to cooperate with the lock pin bores 88 of the outer joint plates 72. As illustrated, the outer and inner joint plates 72 and 74 include a hole sized and configured to accept a rod 106, which is inserted into the hole and welded at each end to secure the joint plates 72 and 74 to the center members 44. Alternate embodiments are contemplated in which the outer and inner joint plates include a plurality of holes for accepting cooperating fasteners for securement to the center members 44. The legs 80 and 82 may also be secured to respective center members via welding or the like.

To assemble the center frame joint 70, one or more inner joint plates 74 are placed together and aligned. Next, an outer plate 72 is placed on each side of the inner joint plate(s) 74 so that the central bores 84 and 90 align, but with the legs 80 of the outer plates 72 extending in the direction opposite of the leg(s) 82 of the inner joint plate(s) 74. The inner joint plates 74 are then rotatably connected to the outer joint plates 72 by a cylindrical guide pin 98. The guide pin 98 is retained therein by snap rings 96 that engage circumferential grooves 100 formed in opposing ends of the guide pin 90. The guide pin 98 is optionally formed with a plurality of grooves 100 thereon in order to accommodate joints having different thicknesses.

A purlin pin assembly 120 has a central portion with a diameter corresponding to that of purlin pin bore 86 of the outer joint plate 72. The purlin pin assembly 120 extends through the purlin pin bores 86 of the outer joint plates 72 and the arcuate slot 92 of the inner joint plate 74. The purlin pin assembly 120 is retained therein by snap rings 96 that engage circumferential grooves 124 formed in opposing ends of the purlin pin assembly 120. FIG. 8 shows one embodiment of a purlin pin assembly 120 suitable for use with the center frame joint 70 of one of the end frame supports 40A and 40F. The purlin pin assembly 120 includes a cylindrical pin 122 with circumferential grooves 124 formed at opposing ends thereof. In the disclosed embodiment, the cylindrical pin 122 has an inner pair of grooves 124 and an outer pair of grooves 124 formed thereon. As with the guide pins 90, the two sets of corresponding grooves 124 allow a single purlin pin assembly 120 to be utilized in joints having different widths. The cylindrical pin 122 preferably includes a flat portion formed along one side. When utilized with the center frame joint 70, the flat portion engages a flat portion of the purlin pin bore 86 to prevent the purlin pin assembly 120 from rotating within the purlin pin bore.

A lug 126 extends along a longitudinal axis from one end of the pin 122. The purlin pin assembly 120 further includes a purlin fitting 128 having a cylindrical body 130 with a clevis 132 extending longitudinally from one end. The clevis 132 is sized and configured to engage the lug 126 of the pin 122. A center pin 134 extends transversely through the clevis 132 and the lug 126 to rotatably couple the cylindrical body 130 of the purlin fitting 128 to the pin 122. It will be appreciated that the described embodiment is just one example and that other configurations to rotatably couple the purlin fitting 122 to the pin 122 are possible and that such configurations should be considered within the scope of the present disclosure.

Referring back to FIG. 7, rotation of the center joint 70 is limited by the travel of the purlin pin assembly 120 within the arcuate slot 92. That is, as the center joint 70 rotates about the axis of the guide pin 98, the purlin pin assembly 120 moves through the slot 92 until the purlin pin assembly abuts an end of the slot. At this point, the engagement of the purlin pin assembly 120 with the end of the slot 92 prevents further rotation of the center joint 70 in that direction. Thus, the purlin pin assembly 120 limits the rotation of the center joint 70 between a first position, in which the frame 22 is in an erected position, and a second position, in which the frame 22 is in a collapsed position. When the frame 22 is in the first (erected) position, a lock pin 102 is inserted through the lock pin bores 88 and 94 of the outer and inner joint plates 72 and 74 to temporarily fix the position of the center joint 70 in the first position. To move the center joint 70 to the collapsed position, the lock pin 102 is removed, and the center joint is free to rotate to the second position.

Figure 9:
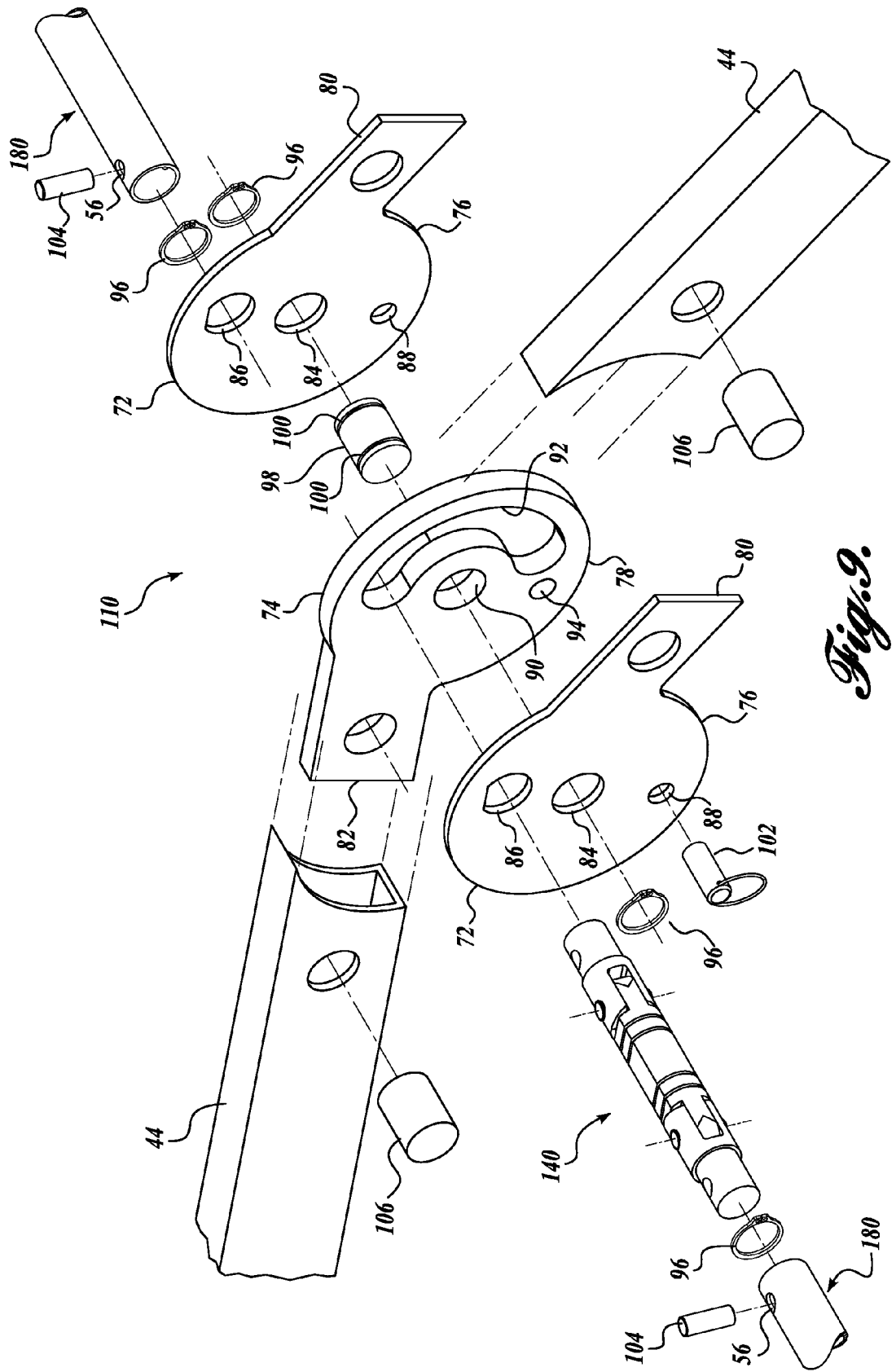
FIG. 9 is an exploded partial isometric view of the center frame joint of FIG. 6, the center frame joint being a double purlin joint.

Still referring to FIG. 7, when the center joint 70 is assembled, the purlin fitting 128 of the purlin pin assembly 120 extends outwardly from one side of the joint. The purlin fitting 128 is sized and configured to be received by the cylindrical end of the purlin assembly 180. With the purlin fitting 128 engaging the end of the purlin assembly 180, a set pin 104 is inserted into an aperture cooperatively formed by throughbores 136 and 56 that extends laterally through the purlin fitting 128 and the end of the purlin assembly 180, respectively, thereby pivotally coupling one end of the purlin assembly 180 to the center joint 70. When coupled to the center joint 70 in this manner, the purlin assembly 180 is free to rotate relative to the center joint about the pivot pin 134 that connects the pin 122 portion of the purlin pin assembly 120 to the purlin fitting 128. The illustrated center joint 70 is one representative embodiment in accordance with the present disclosure; however, other configurations are contemplated and should be considered within the scope of the present disclosure. In this regard, the described guide pin 98 can be a rivet, bolt/nut, or other fastener that couples the inner and outer joint plates together and provides rotation of each about a center axis. For such configurations, the number and location of the purlin assemblies 180 can vary from the illustrated embodiment Referring now to FIGS. 9 and 10, a center joint 110 suitable for use with interior frame supports 40B-40E will be described. Referring to FIG. 9, the illustrated center joint 110 is similar to the center joint 70 shown in FIG. 7, wherein like reference numbers indicate like components. Unlike the center joint 70 of FIG. 7, the center joint 110 of FIG. 9 uses a purlin pin assembly 140 with a purlin fitting 128 at each end instead of purlin pin assembly 120, which has a single purlin fitting 128.

Figure 10:
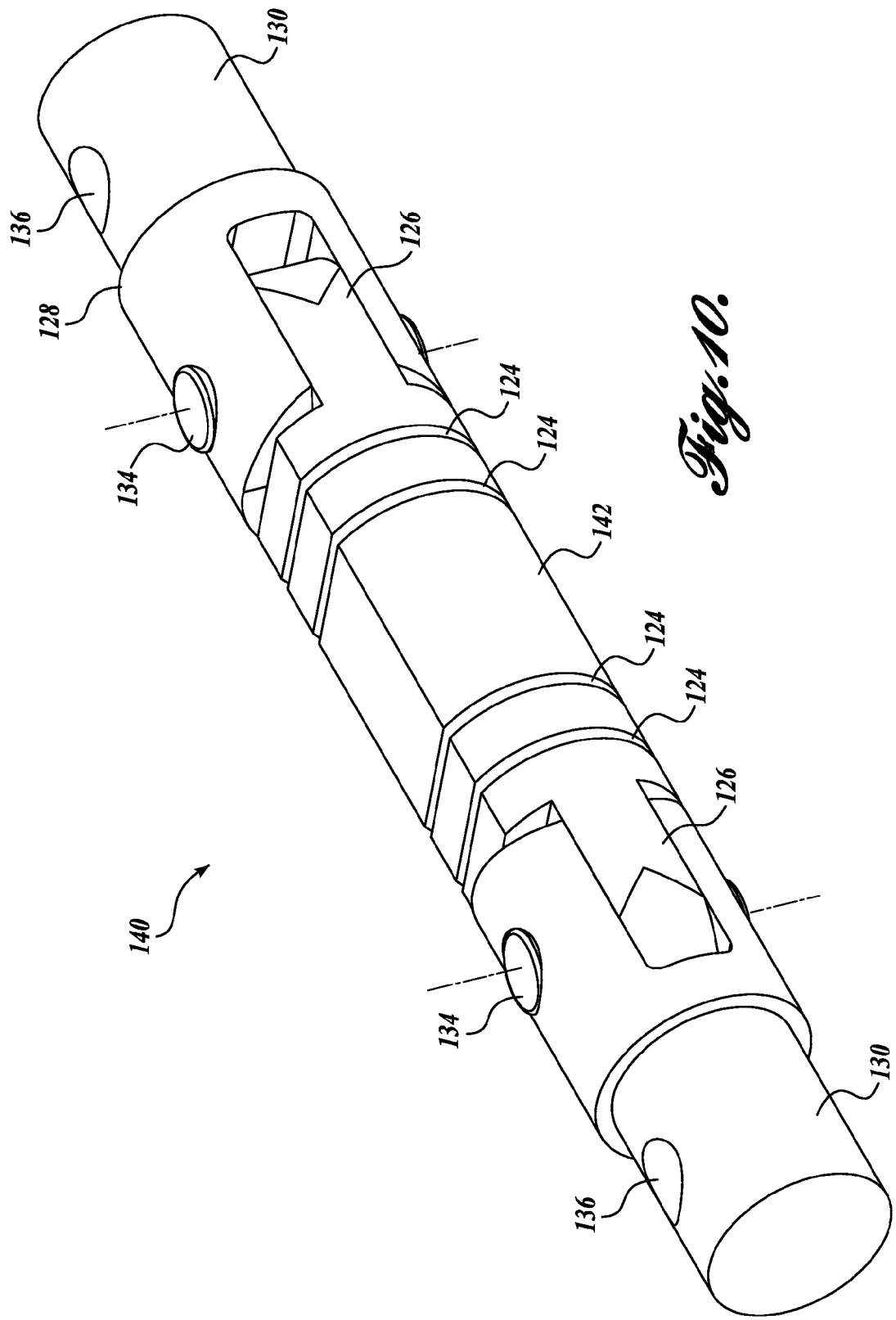
FIG. 10 is an isometric view of a pivot pin assembly of the center frame joint of FIG. 9.

As best shown in FIG. 10, the illustrated embodiment of the purlin pin assembly 140 includes a cylindrical pin 142 with circumferential grooves 124 formed at opposing ends thereof. Similar to the cylindrical pin of the previously described purlin pin assembly 120, the present purlin pin assembly 140 has a flat surface that engages a flat surface in the purlin pin bores 86 of the outer joint plates 72 to prevent the purlin pin assembly 140 from rotating relative to the outer joint plates. A lug 126 extends along a longitudinal axis from each end of the pin 142. The purlin pin assembly 140 further includes a pair of purlin fittings 128. Each purlin fitting 128 has a cylindrical body 130 with a clevis 132 extending longitudinally from one end. The clevis 132 is sized and configured to engage one of the lugs 126 of the pin 142. At each end of the pin 142, a center pin 134 extends transversely through the lug 126 and the clevis 132 of one of the purlin fittings 128 to rotatably couple the cylindrical body 130 of each purlin fitting 128 to an end of the pin 142. As with the previously described purlin pin assembly 120, it will be appreciated that the described embodiment is exemplary and that other configurations to rotatably couple the purlin fitting 128 to the pin 142 are possible and that such configurations should be considered within the scope of the present embodiment.

Referring back to FIG. 9, the center joint 110 is assembled using a guide pin 98 and a purlin pin assembly 140 in a manner similar to the previously described center joint 70 of FIG. 7. When the center joint 110 is assembled, a purlin fitting 128 extends from each side of the center joint. Each purlin fitting 128 is sized and shaped to be received within one end of a purlin assembly 180 and to be secured thereto with a set pin 104. Accordingly, the center joint 110 is capable of having a purlin assembly 180 rotatably coupled to each side of the joint.

Figure 11:
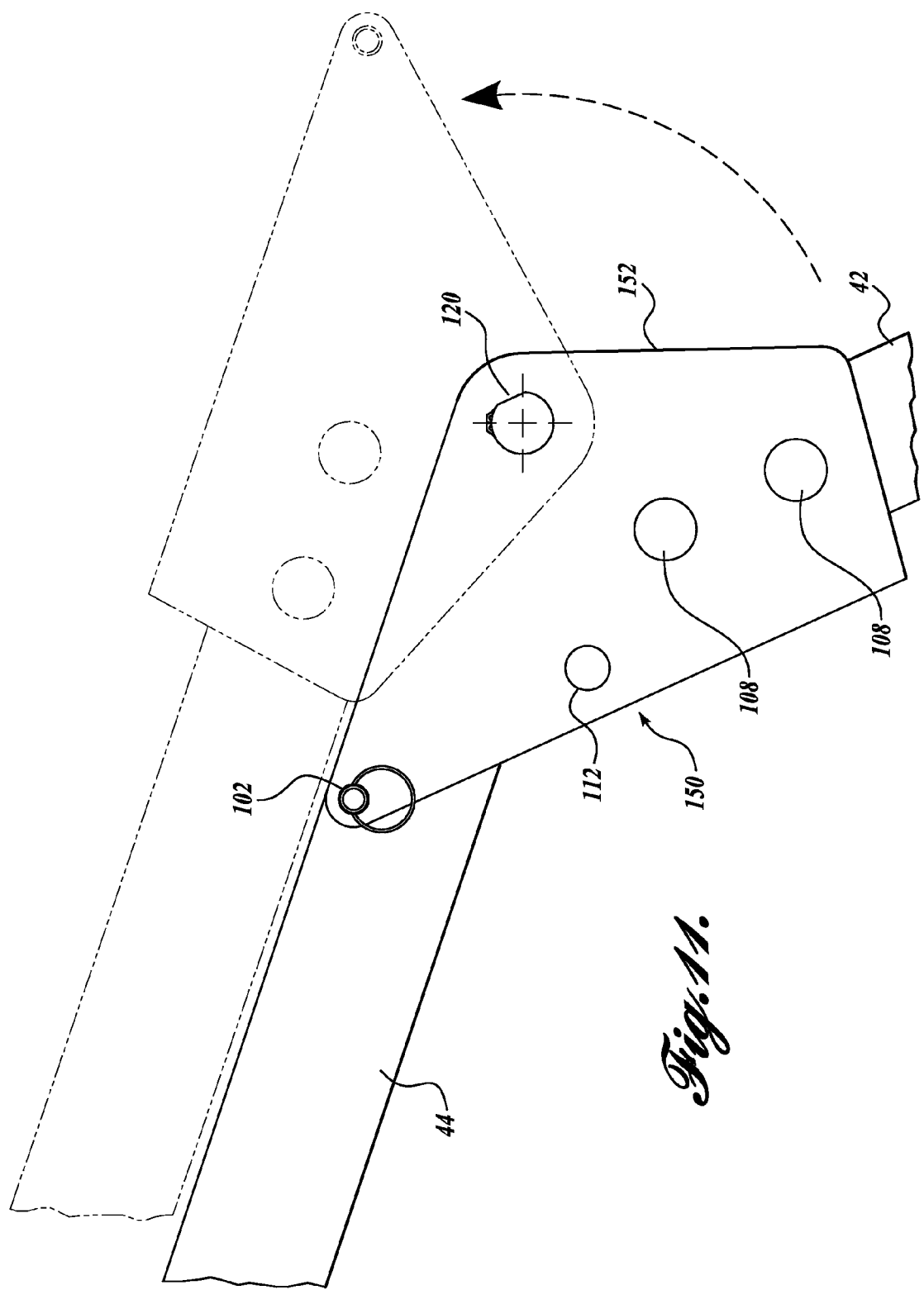
FIG. 11 is an end view of one embodiment of a lateral frame joint formed in accordance with aspects of the present disclosure.
Figure 12:
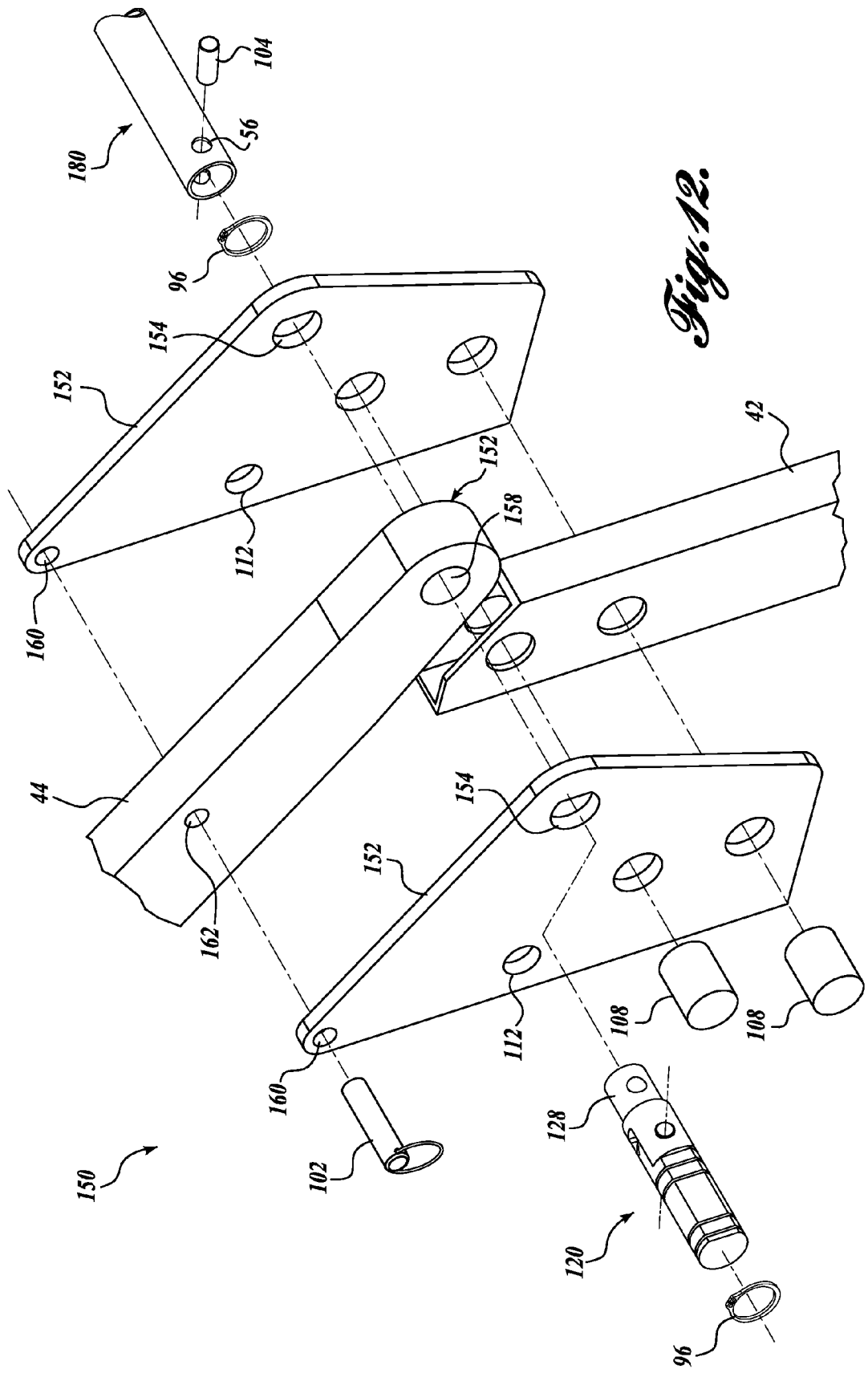
FIG. 12 is an exploded partial isometric view of the lateral frame joint of FIG. 11, the lateral frame joint being joint being a single purlin joint.

FIGS. 11 and 12 show one example of a lateral frame joint 150 for use with the end frame supports 40A and 40F in accordance with the present disclosure. As previously described, the lateral frame joint 150 rotatably connects one end of a center member 44 to an end of a lateral member 42. As shown in FIG. 11, when the frame 22 is erected, the center member 44 and the lateral member 42 are fixedly positioned relative to each other such that the members form an angle of approximately 110 degrees. It should be appreciated that the illustrated angle is exemplary only and should not be considered limiting. In this regard, the angle formed by a given center member 44 and the corresponding lateral member 42 when the frame 22 is erected can vary to accommodate any suitable frame configuration. As will be explained in more detail later, in order to facilitate the collapse of the frame 22, the lateral frame joint 150 provides for selective rotation of the lateral member 42 relative to the center member 44 until the lateral member and center member are generally parallel to each other, as shown in phantom lines in FIG. 11.

Referring now to FIG. 12, a representative embodiment of a lateral frame joint 150 will be described. The lateral frame joint 150 includes a pair of joint plates 152 disposed on opposing sides of the end of the end of the lateral member 42. As illustrated, the joint plates 152 are fixedly coupled to the lateral member 42 using rods 108 welded in place, as previously described with respect to the center frame joint 70; however, it will be appreciated that the joint plate can be secured to the lateral member by fasteners, welding, or any other suitable attachment method. When coupled together, the lateral member 42 and the joint plates 152 cooperate to form a clevis on the end of the lateral member. A joint pin bore 154 extends through each joint plate 152 and is positioned to be offset from the edge of the lateral member 42. Each joint plate further includes lock pin bore 160 formed therein. When the joint plates 152 are coupled to the lateral member, the joint pin bore 154 and lock pin bore 160 of one joint plate align with the corresponding joint pin bore and lock pin bore, respectively, of the opposing plate. As illustrated, the joint plates 152 also include a hole 112 through which a guide wire can be attached to the joint 150 to stabilize the shelter 20, as shown in FIG. 1.

Still referring to FIG. 12, the end of the center member 44 is formed as a lug 156 with a central bore 158 having a size that corresponds to the joint pin bores 154 of the joint plates 152. As illustrated, the lug 156 is integrally formed with the center member 44; however, the lug can be a separately formed component fixedly secured to the center member using fasteners, welding, or any other suitable attachment method. The center member 44 further includes a lock pin bore 162 that aligns with the lock pin bores of the joint plates 152 when the frame is in an erected position.

The lateral member 42 and the center member 44 are rotatably coupled together by the previously described purlin pin assembly 120 extending through the joint pin bores 154 of the joint plates 152 and the central bore 158 of the center member 44. As previously described with respect to center joint 70, the purlin pin assembly 120 is retained within the joint by snap rings 96 that are disposed on opposing sides of the joint plates 152 and engage the grooves 124 of the purlin pin assembly 120. Similar to the previously described purlin pin bore 86 of the center joint 110, the joint pin bores 154 of the lateral frame joint 150 have a flat portion that engages a flat portion of the purlin pin assembly 120 to prevent the purlin pin assembly from rotating in the hole.

When the lateral frame joint 150 is assembled, a purlin fitting 128 extends from one side of the joint to allow a purlin assembly 180 to be pivotally coupled thereto, as previously described with respect to center joint 70 (see FIG. 7). The lateral frame joint 150 is selectively lockable in the erected (open) position by inserting a lock pin 102 though the aligned lock pin bores 160 and 162.

Referring now to FIG. 13, an exemplary embodiment of a lateral frame joint 170 suitable for use with interior frame supports 40B-40E, will be described. The lateral frame joint 170 is similar to the lateral frame joint 150 of FIGS. 11 and 12, wherein like reference numbers indicate like components. Unlike the previously described lateral frame joint 150, the lateral frame joint 170 of FIG. 13 uses purlin pin assembly 140, which allows a purlin assembly 180 to be pivotally coupled to each side of the joint, as previously described with respect to center frame joint 110 (see FIG. 9).

It will be appreciated that the illustrated lateral frame joints are exemplary only and other configurations are contemplated. For example, in one alternate embodiment, the joint plates are couple to the center member, and the lug is formed on the lateral member. In another example, a clevis that engages the lug is integrally formed with either the lateral member or the center member. These and other variations will be apparent to those of ordinary skill in the art and should be considered within the scope of the present disclosure.

The purlin assemblies 180 extend longitudinally between adjacent frame supports to maintain spacing between the frame supports and to provide stability to the frame 22 when the frame is erected. Each purlin assembly 180 is pivotally coupled at each end to a frame support. In order to allow for the frame 22 to be collapsed without having to remove the purlin assemblies 180, each purlin assembly is selectively foldable about a purlin mid joint 184.

Referring to FIGS. 14 and 15, one example of a purlin assembly 180 in accordance with the present disclosure will be described. Each purlin assembly includes a pair of elongate members 182. The elongate members 182 are preferable formed from lightweight hollow tubing, such as round aluminum tubing, but it will be appreciated that the material and cross-sectional properties of the members can vary within the scope of the present disclosure.

The elongate members 182 are rotatably coupled about double-hinged purlin mid joint 184. The purlin mid joint 184 includes center fitting 188 with a pair of lugs 190 extending in opposite directions. Rotatably attached to each lug 189 about a center pin 134 is a previously described, clevis-shaped purlin fitting 128. Each purlin fitting 128 is in turn received within the end of one of the elongate members 182 and secured therein with a set pin 104. The disclosed purlin mid joint 184 is just an example, and it is contemplated that various alternate double-hinge configurations can be utilized. Such configurations should be considered within the scope of the present disclosure.

A sleeve 186 is slidably associated with the elongate members 182. When the members are positioned to be approximately coaxial, the sleeve 186 is selectively positionable over the purlin mid joint 184. When so positioned, the sleeve 186 limits rotation of each elongate member 182 relative to the center fitting 188, thereby securing the purlin assembly 180 in an extended position (see FIG. 14). When the sleeve 186 is moved so that it does not cover the purlin mid joint 184, the elongate members 182 are rotatable relative to the center fitting 188 so that the elongate members can be positioned to be generally parallel to each other in a "folded" position (see FIG. 15). Thus, each purlin assembly 180 is selectively positionable between a locked, extended position and a folded position.

Referring now to FIGS. 16A and 16B, a rotatable base 200 is preferable coupled to the lower end of each lateral member 42 to help stabilize the shelter 20. The rotatable base 200 includes a plate 202 with a pair of lugs 204 extending in a perpendicular direction from opposing sides of the plate 202. The base 200 is rotatably coupled to the lower end of the lateral member 42 about a bolt, pin, or other suitable element that extends through holes formed in both plates 202 and the lateral member 42.

When the shelter 20 is erected, the base 200 extends laterally from the lateral member 42 and provides a larger "footprint" to support the shelter (FIG. 16A). The base 200 is selectively secured in the open position by a removable lock pin 102 that extends through a hole 206 formed in the lateral member 42 and at least one of the lugs 204.

When the shelter 20 is collapsed the lock pin 102 at each base 200 is removed, and the base 200 is rotated into the position shown in FIG. 16B. The lock pin 102 is then inserted back into the hole in the lateral member 42 for storage.

It will be readily apparent to one of ordinary skill in the art that various alternate embodiments of the exemplary disclosed shelter are possible without departing from the sprit and scope of the present disclosure. For example, the number, spacing, and erected form of the frame elements can vary to provide shelters of different sizes and shapes. Moreover, it is contemplated that two or more shelters can be connected end to end, by lateral passageways, or a combination thereof. In this manner, shelters of varying sizes with distinct, separate areas can be configured using a multitude of smaller, standard shelters. These and other variations of the disclosed embodiments are contemplated and should be considered within the scope of the disclosed subject matter.

Figure 3:
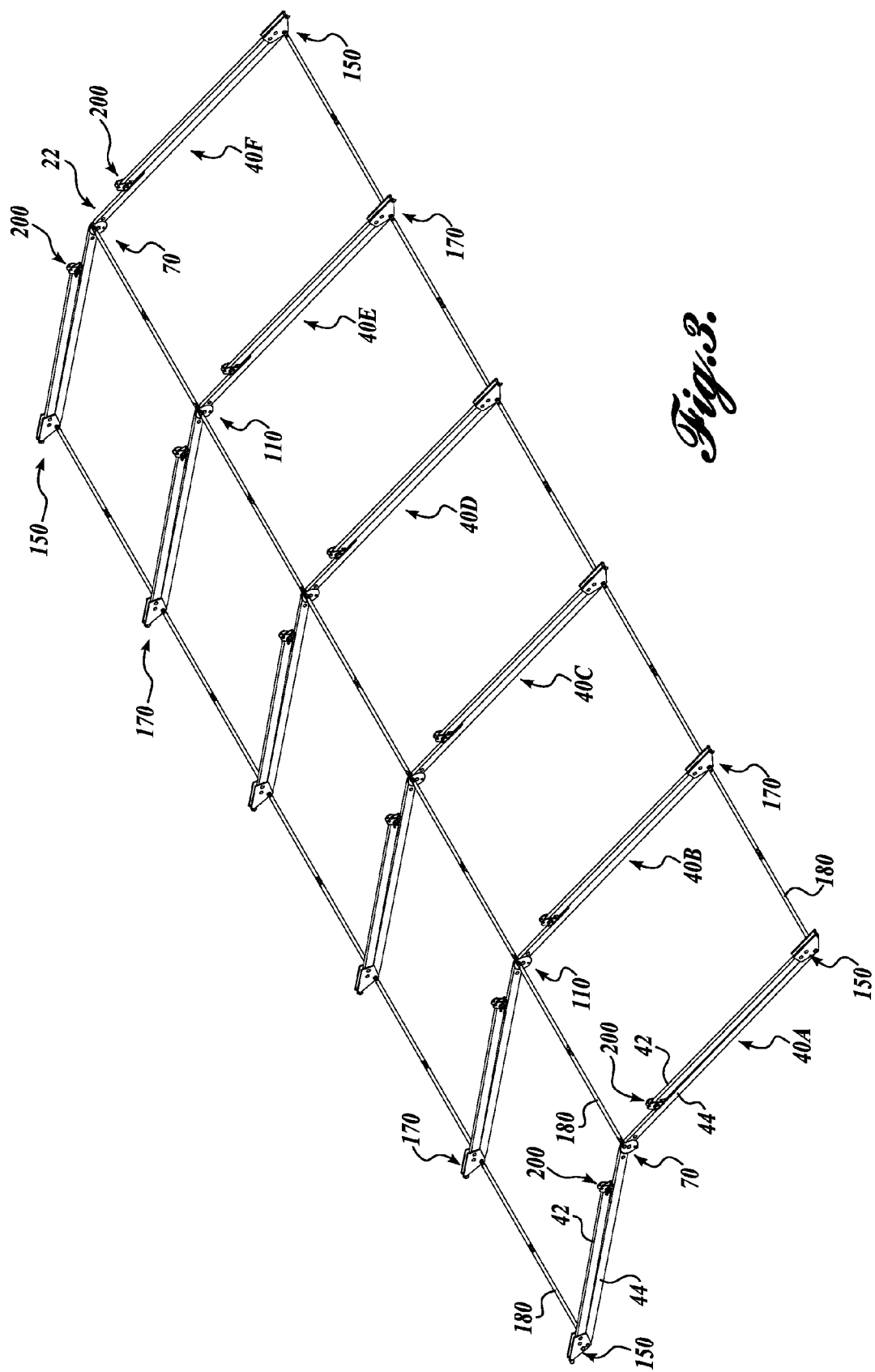
FIG. 3 is an isometric view of a collapsible frame of FIG. 2, the frame being in a first semi-collapsed state.
Figure 4:
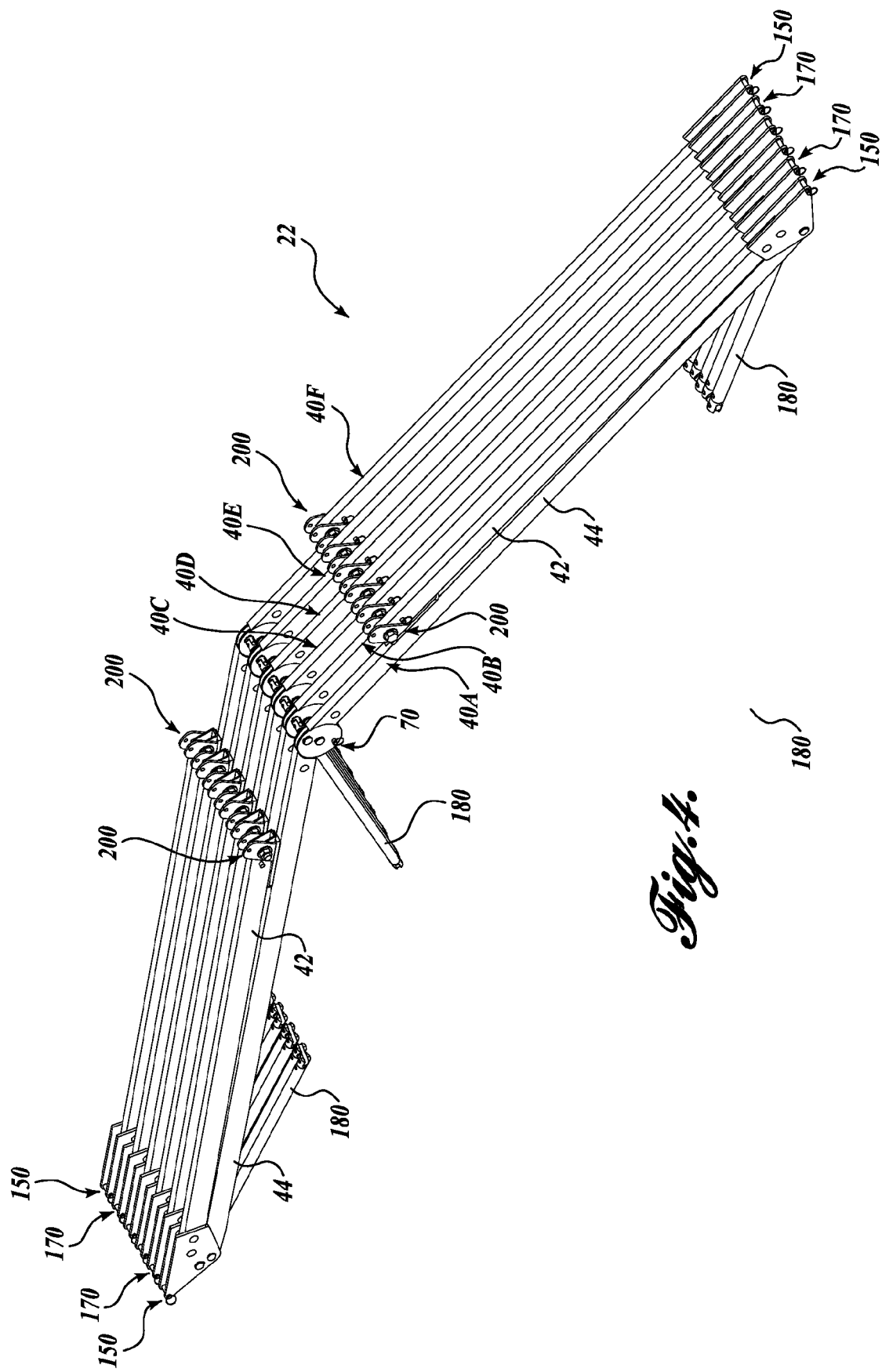
FIG. 4 is an isometric view of a collapsible frame of FIG. 2, the frame being in a second semi-collapsed state.

Referring back to FIGS. 1-5, one exemplary embodiment of a method for collapsing a portable shelter and, more specifically, a shelter frame, will be described. Starting with the erected shelter 20 of FIG. 1, the tent-like structure 24 and associated guide wires, stakes, etc. are removed from the frame, shown in FIG. 2. Next, the lock pins 102 are disengaged from the lateral frame joints 150 and 170, and each lateral member 42 is rotated about the its respective joint until it is generally parallel with the corresponding center member 42, as shown in FIG. 3. Next, the purlin assemblies 180 are unlocked by sliding the sleeves 186 away from the purlin mid-joints. The frame supports 40A-40F are moved together, as shown in FIG. 4, with the purlin assemblies 180 folding inward between the frame supports. Finally, the lock pins 102 are disengaged from the center joints 70 and 110, and the center members 44 are rotated relative to each other until they are generally parallel, as shown in FIG. 5. The collapsed frame is optionally secured with straps, placed in a container, or otherwise secured in the collapsed state and is ready for transport. To erect portable shelter, these steps are simply reversed to proceed from the configuration shown in FIG. 5 to the configuration shown in FIG. 1. It will be appreciated that the order of the steps of the described methods are exemplary only and should not be considered limiting. In this regard, the order of the steps may vary within the scope of the present disclosure.

The disclosed example of a collapsible shelter is advantageous over known shelters in that it allows for quick set up and disassembly by a minimum number of people. The lightweight construction combined with joints that keep the frame components connected, even when the shelter is disassembled, makes set up and disassembly more manageable so as to require fewer people. In this regard, the disclosed shelter can be easily set up by two or three people or, if necessary, by a single person. Further, the inclusion of lock pins and sleeves to selectively fix the various frame joints in their erected positions eliminates the need for tool and also makes assembly of the frame easier, as these locking devices inherently position the various frame elements when utilized. Moreover, the disclosed frame joints have a limited range of rotation, with the limits of rotation being the erected and collapsed joint positions. These and other disclosed features of the illustrated collapsible shelter combine to provide a shelter that is quickly and easily erected by a minimum number of people.

One or more embodiments described herein may be employed with a solar fly, one example of which is sold under the trademark THERMACAM. As best shown in FIG. 17, one embodiment of a solar fly, generally designated 220, includes a durable and flexible outer cover 252. The outer cover 252 is of sufficient length to completely extend longitudinally over the shelter 20, as best shown in FIG. 16. Also, the outer cover 252 is of sufficient width to extend transversely over the majority of the shelter 20. In one embodiment, the longitudinal edges of the outer cover 252 are positioned approximately 12-60 inches above ground or other supporting surface. On the outer side of the solar fly 220, a plurality of guy lines 260 may be employed in order to secure the solar fly 220 over the shelter 20. The outer side of the solar fly 220 may also be contoured to so as not to hinder use of any doors that are optionally positioned on the side of the shelter.

The outer cover 252 in one embodiment is made of one or more layers of solid and/or low or non gas permeable material such as a polyester reinforced vinyl fabric, military grade canvas fabrics, nylon fabrics, Cordura® fabrics, military spec. 44103D fabrics, etc. The outer cover 252 includes one or more semi-permeable areas positioned in various locations of the outer cover 52. In that regard, the outer cover 52 in several embodiments includes one or more longitudinally extending areas 290A of mesh, such as vinyl mesh fabric, vinyl coated mesh, nylon mesh, military grade mesh fabric, wire mesh, etc., positioned at or near the crest or apex 292 of the roof 94 of the shade shelter 20. The interstices of the longitudinally extending areas 290A of mesh are sized and configured so as to permit air flow through the outer cover 252, and in some embodiments, the interstices may be of a diamond configuration, hexagonal configuration, rectangular configuration, etc., just to name a few. In use, the areas 290A may act like a vent to allow hot, rising air to escape through the solar fly 220 from the space formed between the outer cover 252 and the tent-like structure 24, which may in turn, pull cooler air from the bottom of the longitudinal sides and ends of the solar fly, thereby creating convectional air flow sometimes referred to as a chimney effect.

In other embodiments, the outer cover 252 may also include one or more longitudinally extending areas 290B of mesh, such as vinyl mesh fabric, vinyl coated mesh, nylon mesh, military grade mesh fabric, wire mesh, etc., positioned on the sides of the outer cover 52 at approximately the height of any windows of the associated shelter 20. In some embodiments, the interstices of the longitudinally extending areas 290B of mesh are sized and configured so as to provide visibility to the occupants of the shelter 24 so that the occupants may see through the windows and out through the outer cover 52. Additionally or alternatively, the interstices of the longitudinally extending areas 290B of mesh are sized and configured so as to permit air flow through the outer cover 252. In some embodiments, the interstices may be of a diamond configuration, hexagonal configuration, rectangular configuration, etc., just to name a few.

In several embodiments, the semi-permeable areas, including areas 290, provide between approximately 55-90% solar protection from the sun's rays. In one embodiment, the areas 290 provide approximately 85% solar protection from the sun's rays. In these or other embodiments, an optional blackout layer may be attached along the interior surface of the outer cover 252 other than in the semi-permeable areas, which solely, or in combination with the outer cover 252, aid in the prevention of light emission through solar fly 220. In one embodiment, the blackout layer is chosen so that the outer cover 252 provides greater than 80% and up to 100% solar protection from the sun's rays. One or more materials that can be employed in the blackout layer include but are not limited to carbon, carbon blends, etc. The outer cover 252 may have a camouflaged exterior color that matches the environment, if desired.

In a first embodiment, the over cover 252 of the solar fly 220 contacts and is supported by the frame supports 40A-40E. In some embodiments, the solar fly can be spaced from the frame supports by spacers (not shown). Examples of spacers that may be practiced with embodiments of the present disclosure are set forth in detail in co-pending Application Ser. No. 61/653,948, filed May 31, 2012, the disclosure of which is hereby incorporated by reference.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A frame for a portable shelter, the frame being selectively articulable between an erected state and a collapsed state, the frame comprising:
   (a) first and second frame supports,
   each frame support comprising a pair of center frame members rotatably coupled about a center joint, and a pair of lateral frame members, each lateral frame member being rotatably coupled to one of the center frame members about a lateral joint,
   each pair of center frame members being selectively moveable between a first position when the frame is in the erected state and a second position when the frame is in the collapsed state, wherein the first and second frame supports are selectively lockable in the first position;
   each pair of lateral frame members being selectively moveable between a first position when the frame is in the erected state and a second position when the frame is in the collapsed state; and
   (b) a plurality of purlin assemblies, each purlin assembly comprising first and second purlin members rotatably coupled about a purlin mid joint, a first end of the purlin assembly being pivotally coupled to the first frame support, a second end of the purlin assembly being pivotally coupled to the second frame support, the purlin assembly being selectively lockable in an extended position when the frame is in the erected state, the purlin members being rotatable to a folded position when the frame is in the collapsed state,
   a first one of the purlin assemblies being pivotally coupled to the first and second frame supports at respective center joints, a second one of the purlin assemblies being pivotally coupled to the first and second frame supports at one pair of respective lateral joints, and a third one of the purlin assemblies being pivotally coupled to the first and second frame supports at another pair of respective lateral joints.

2. The frame of claim 1, wherein each center joint comprises a pivot pin assembly defining an axis of rotation of the center joint, each first purlin member being rotatable about the axis of rotation of the first center joint.

3. The frame of claim 2, wherein each first purlin member is rotatable about a second axis of rotation normal to the axis of rotation of the first center joint.

4. The frame of claim 2, wherein each second purlin member is rotatable about the axis of rotation of the second center joint.

5. The frame of claim 4, wherein each first purlin member is rotatable about a second axis of rotation normal to the axis of rotation of the first center joint, and wherein each second purlin member is rotatable about a third axis of rotation normal to the axis of rotation of the second center joint.

6. The frame of claim 1, each purlin assembly further comprising a sleeve slidably associated with each first purlin member, the sleeve being selectively positionable to lockingly engage the purlin mid joint.

7. A portable shelter, comprising:
(a) a plurality of selectively collapsible frame supports spaced apart in a series along a longitudinal axis, each frame support extending transversely with respect to the longitudinal axis, each frame support comprising a pair of center frame members rotatably coupled about a center joint, and a pair of lateral frame members, each lateral frame member being rotatably coupled to one of the center frame members about a lateral joint;
(b) a plurality of purlin assemblies extending longitudinally between the frame supports, a first one of the purlin assemblies pivotally connecting one frame support to an adjacent frame support at respective center joints, a second one of the purlin assemblies pivotally connecting one frame support to an adjacent frame support at one pair of lateral joints, and a third one of the purlin assemblies pivotally connecting one frame support to an adjacent frame support at another pair of lateral joints, the plurality of purlin assemblies selectively maintaining a space between adjacent frame supports, each of the plurality of purlin assemblies being foldable to move adjacent frame supports towards each other; and
(c) a flexible structure supported by the frame support members.

8. The portable shelter of claim 7, wherein at least one of the collapsible frame supports comprises at least two frame members rotatably coupled to each other, the at least two frame members being selectively rotatable between an erected position and a collapsed position.

9. The portable shelter of claim 7, wherein each of the plurality of purlin assemblies is selectively lockable in an extended position.

10. The portable shelter of claim 7, further comprising a fly supported by at least one of the collapsible frame supports and at least partially disposed over the flexible structure.

11. The portable shelter of claim 10, wherein the fly comprises:
(a) at least one of a low gas permeable material and a non gas permeable material; and
(b) one or more longitudinally extending areas of a mesh sized and configured to permit air flow therethrough.

12. The portable shelter of claim 11, wherein the one or more longitudinally extending areas of a mesh includes a first area located on a lower portion of the fly and a second area located on an upper portion of the fly, the first and second areas cooperating to induce convectional air flow between the flexible structure and the fly.

13. A method of collapsing a portable shelter frame as recited in claim 1, the method comprising:
(a) rotating each lateral frame member about the corresponding lateral joint from a first lateral member position, in which the lateral member extends in a downward direction from the lateral joint, to a second lateral member position, in which the lateral frame member is aligned with the corresponding center frame member;
(b) moving the spaced apart frame supports together so that each frame support is proximate to one or more adjacent frame supports, movement of the frame supports folding each of the plurality of purlin assemblies about a respective purlin mid joint; and
(c) rotating the two center frame members of each frame support from its first position to its second position in which the two center frame members are aligned.

14. The method of claim 13, further comprising unlocking the center joints and the lateral joints.

* * * * *